UNITED STATES PATENT OFFICE.

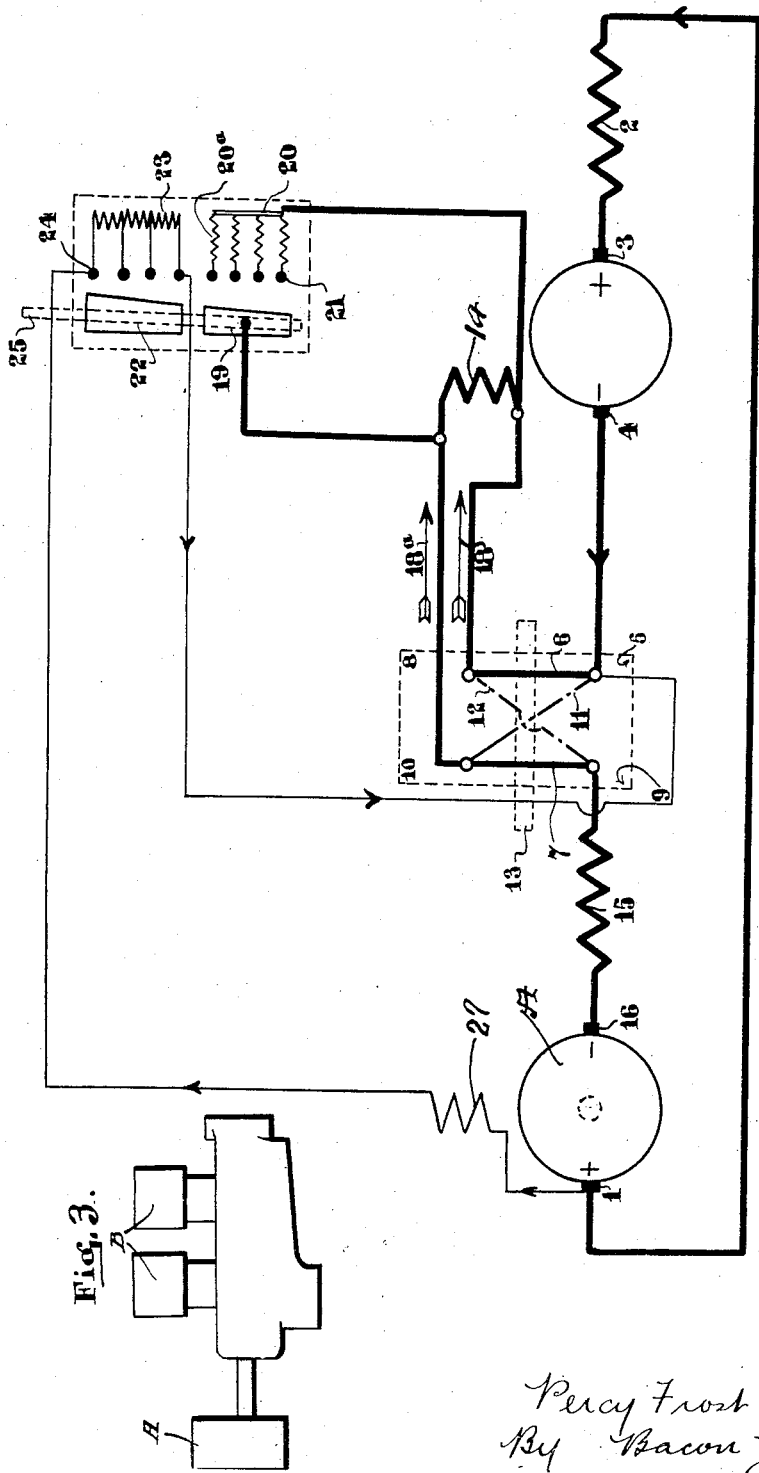

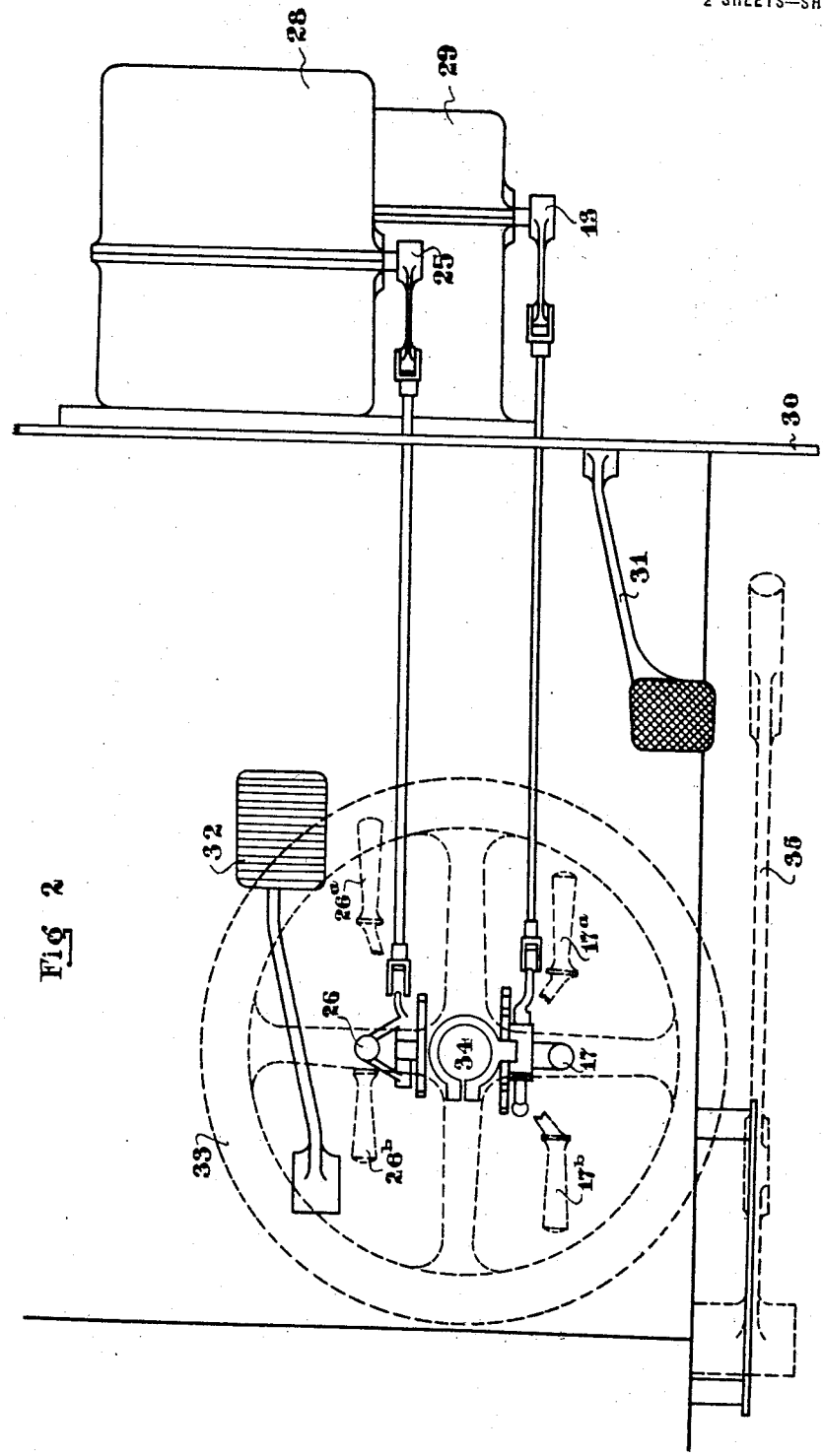

PERCY FROST SMITH, OF KENT, ENGLAND, ASSIGNOR TO TILLING-STEVENS LIMITED, OF MAIDSTONE, KENT, ENGLAND, A CORPORATION OF GREAT BRITAIN.

MEANS OF CONTROL FOR PETROL ELECTRIC VEHICLES.

1,405,345. Specification of Letters Patent. Patented Jan. 31, 1922.

Application filed August 9, 1917. Serial No. 185,378.

*To all whom it may concern:*

Be it known that I, PERCY FROST SMITH, a subject of the King of Great Britain and Ireland, and a resident of Kent, England, have invented an Improved Means of Control for Petrol Electric Vehicles, for which I have filed an application in Great Britain, 104,819, (10,361, July 22, 1916), of which the following is the specification.

This invention relates to improved means of control in petrol electric vehicles, particularly in those petrol electric vehicles in which no battery is employed but which are driven by one electric motor transmitting power to a differential gear upon the back axle.

The object of this invention is to provide more efficient and simpler means of control for petrol electric vehicles of the said type whereby the whole of the control of power and speed of the vehicle supplied by an internal combustion engine or other prime mover to a generator or dynamo thence to the electric motor, is effected by varying the current and the voltage by means of a single lever for all variations in forward drive.

A further object of the invention is to simplify the electrical connections for varying and controlling the current between the generator and the electric motor.

A shunt or compound wound electric generator is directly coupled to the internal combustion engine, and the electric motor drives the differential of the back axle through worm or other gear.

The said single lever which operates the controller is preferably mounted on the near side of the steering column. In this controller two distinct sets of resistance units are provided which are cut in and out of circuit by means of contacts mounted on an insulated spindle connected to the said single lever. One set of units, those of the generator field is connected in series and is used in series with the generator field winding. The other set, those of the motor shunt field, is connected in parallel and is used in parallel with the motor field.

A reversing switch is provided which is operated by a lever preferably fitted on the off-side of the steering column. This switch breaks the main circuit in two places and also enables the direction of current in the motor field to be changed, thus giving a forward or reverse movement to the vehicle. One end of the generator field winding of the dynamo is connected by means of the reversing switch to a terminal at one end of the motor field winding so that the generator field winding is excited through the motor field and is so connected that when a heavy torque is required from the motor, and the current consequently increases, the drop in voltage across the motor field winding reduces the voltage across the generator field winding. This weakens the generator main field and tends to allow the speed of the engine to rise.

The control action is effected as follows: When the controller lever is drawn back this withdraws the contacts from the fingers or buttons to which the generator field resistances are connected, thus placing the whole of them in series with the generator field winding, weakening the generator field and cutting the motor field resistance out of circuit. On opening the engine throttle, the dynamo commences to pick up the load and the dynamo voltage rises. The motor will then speed up and the dynamo volts still rise. The single lever is then gradually pushed forward and this commences to short circuit the generator field resistance, thus strengthening the generator field. Further movement of the lever commences to connect the motor field resistances in parallel with the motor field, thus weakening the motor field and causing the motor to speed up.

When climbing a stiff gradient the heavy torque required by the motor loads up the internal combustion engine and the controlling lever is then gradually drawn back, this will strengthen the motor field and increase the torque of the motor. Further movement places the generator field units in circuit with the generator field winding, thus weakening the generator field and allowing the engine speed to rise.

And in order that my invention may be completely understood, reference should be made to the accompanying drawings which illustrate a preferred example or mode of carrying it into effect:—

Fig. 1 is a diagram of the arrangement and the connections, the reversing switch box, and the controller box being indicated in dotted lines.

Fig. 2 is a plan of the front of the vehicle showing the operative connections of the levers on the steering wheel and column.

Fig. 3 is a detail side elevation illustrating in a conventional way the petrol engine and its connection with the dynamo electric machine or generator.

A designates a generator or dynamo electric machine which is directly coupled with the petrol engine B. The positive brush 1 of the armature of the generator A is connected to one end of the motor interpole winding 2, thence to the positive brush of the motor armature 3. 4 is the negative brush of the motor armature which is connected to the contact 5. 6 and 7 are the reversing switch forward contact pieces connecting the contact 5 to the reversing switch contact 8, and the reversing switch contact 9 to the reversing switch contact 10. 11 and 12 are the reversing switch reverse contact pieces connecting the contact 5 to the reversing switch contact piece 10 and the contact 9 to the contact 8.

A neutral position is provided on the reversing switch breaking the circuit between the reversing switch contact 10 and the reversing switch contact 9, and the contact 8 and the contact 5, so preventing the passage of any current to the motor. Contact pieces 6 and 7 and 11 and 12 are mounted on the reversing switch spindle 13 (see also Fig. 2) and are insulated from one another and from this spindle. The reversing switch contact 8 is connected to one end of the motor field winding 14, thence the connection is to the reversing switch contact 10, the reversing switch contact 9 is connected to one end of the generator interpole winding 15, then connected to the generator armature negative brush 16. The arrow 18 shows the direction of the current to the motor field winding 14, when the reversing switch lever 17 as shown in dotted lines is in the forward position 17$^a$ in Fig. 2. The arrow 18 shows the direction of current in the motor field winding 14 when the reversing switch is in the reverse position 17$^b$. This is the position for the reverse of the vehicle. The controller contact segment 19 is connected to one end of the motor field winding 14, the motor field resistance bus bar 20 is connected to the other end of the motor field winding 14, and the bus bar 20 connects one end of the motor field resistances together. One end of the motor field resistances is connected to the contact fingers 21. 22 is the generator field resistance contact. 23 are the generator field resistances connected in series with one another. 24 indicates the generator field resistance contact fingers and the tappings or connections are connected to the generator field resistances from these.

Upon the controller spindle 25 (see also plan Fig. 2) are mounted the motor field resistance contact segment 19 and the generator field resistance contact segment 22 which are insulated from one another and the spindle 25. The controller spindle 25 is coupled by the lever and link as shown in Fig. 2 to the single operating controlling lever 26 which lever is shown dotted in the forward position for weak motor field, and also shown in the backward position for producing a weak dynamo field. The reversing switch spindle 13 (see Figs. 1 and 2) is mechanically coupled to the operating lever 17 on the off-side of the steering column, which lever is also shown dotted for the forward position and for the reverse position.

The generator field winding 27 is connected to one end of the generator field resistance and the connections from the other end thereof connect the generator field to the reversing switch contact 5.

With the reversing switch in the neutral position it will be seen that the main circuit is broken between the generator and the motor armature.

The shunt field winding is connected to the negative brush of the motor armature and the inductive "kick" from the generator field winding is opposed by the resistance of the motor armature and interpole.

When the reversing switch is in the forward or the reverse position the shunt is excited through the motor field winding with a consequent increase in torque from the motor and a corresponding increase of current in the motor field winding, and the fall in voltage through the motor field winding will slightly decrease the voltage across the generator field winding and reduce the strength of the generator field, and tend to allow the engine speed to rise. When the controller spindle 25 (Fig. 1) is moved forward it will gradually short circuit the generator field resistance 23, and then gradually place the motor field resistance in parallel with the motor field winding.

Referring to Fig. 2, the controller box or casing 28 and the reversing switch box or casing 29 are both secured on the front of the dashboard 30. The throttle pedal of the engine 31 and the brake foot pedal 32 are diagrammatically indicated. 33 is the steering wheel shown in dotted lines, and 34 the steering wheel pillar, 35 is the brake lever.

It will be understood that when the vehicle is running on the level with the maximum load the generator field is strengthened by short circuiting the fingers or buttons 24, thus cutting out the resistances 23, still further movement of the lever connects the buttons 21 to the contact 19 gradually introducing resistances 20$^a$ in parallel with the motor field, thus shunting the current supply to the motor field and weakening the counter electromotive force of the motor causing the motor to speed up.

It will also be understood that to obtain the maximum torque from the motor at the lowest speed and greatest load, the motor field is strengthened by the movement of the controller lever and by the further movement of the same lever the generator field is then weakened.

What I do claim as my invention and desire to secure by Letters Patent is:—

In a petrol electric vehicle, the combination of a petrol engine adapted to operate at different speeds, a dynamo directly coupled to the petrol engine, said dynamo having a shunt field winding, an electric motor having a series field winding and connected with the vehicle power shaft, the dynamo having its field-winding stationary and being connected with the electric motor to supply current thereto, resistance units adapted to be connected in series with the shunt field-winding of the dynamo, resistance units adapted to be connected in shunt with the series field-winding of the motor, and means for gradually and progressively cutting in and out of the circuit the resistance units of the dynamo field to vary the voltage of the current supplied to the motor, and for cutting in and out the resistance units of the motor-field for varying the back or counter-electromotive force of the electric motor to accelerate or decelerate the speed of the vehicle, and a single manually operated control lever for said means.

PERCY FROST SMITH.

Witnesses:
I. D. ROOTS,
V. S. ROBINSON.